(12) United States Patent
Chase et al.

(10) Patent No.: US 10,330,212 B2
(45) Date of Patent: Jun. 25, 2019

(54) FLUIDIC CONTROL VALVE WITH SMALL DISPLACEMENT ACTUATORS

(71) Applicant: Regents of the University of Minnesota, Minneapolis, MN (US)

(72) Inventors: Thomas R. Chase, Minneapolis, MN (US); Nebiyu Fikru, Minneapolis, MN (US); Alexander M. Hargus, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 81 days.

(21) Appl. No.: 15/399,150

(22) Filed: Jan. 5, 2017

(65) Prior Publication Data

US 2017/0211716 A1 Jul. 27, 2017

Related U.S. Application Data

(60) Provisional application No. 62/287,655, filed on Jan. 27, 2016.

(51) Int. Cl.
*F16K 31/00* (2006.01)
*F16K 47/08* (2006.01)

(52) U.S. Cl.
CPC ............ *F16K 31/007* (2013.01); *F16K 47/08* (2013.01); *Y10T 137/8242* (2015.04); *Y10T 137/86759* (2015.04); *Y10T 137/87265* (2015.04)

(58) Field of Classification Search
CPC ........ F16K 31/007; F16K 47/08; F16K 47/04; Y10T 137/87265; Y10T 137/8242; Y10T 137/86759; Y10T 137/86718

USPC ..... 251/129.06; 137/599.01, 625.28, 625.33, 137/554
See application file for complete search history.

(56) References Cited

U.S. PATENT DOCUMENTS

| | | | | |
|---|---|---|---|---|
| 3,729,025 A | * | 4/1973 | Silvestrini ........... | F16K 31/0658 137/516.11 |
| 4,158,368 A | * | 6/1979 | Clark ...................... | F16K 31/02 137/487.5 |
| 4,437,644 A | * | 3/1984 | Wilmers .............. | F02M 51/005 123/472 |
| 4,538,642 A | * | 9/1985 | Schutten ................... | F01L 5/02 137/625.28 |
| 4,659,062 A | * | 4/1987 | Mooney .................... | F16K 7/17 137/489 |

(Continued)

OTHER PUBLICATIONS

Fazal, I., and Elwenspoek, M.C., "Design and Analysis of a High Pressure Piezoelectric Actuated Microvalve" Journal of Micromechanics and Microengineering, vol. 17, No. 11, Nov. 2007, pp. 2366-2379.

(Continued)

*Primary Examiner* — John Bastianelli
(74) *Attorney, Agent, or Firm* — Brian D. Kaul; Westman, Champlin & Koehler, P.A.

(57) ABSTRACT

A fluidic control valve includes a piezostack actuator, a seal plate, and an orifice plate including a plurality of orifices. The piezostack actuator is configured to move the seal plate along a longitudinal axis between a closed position, in which the seal plate seals the orifices of the orifice plate and closes the valve, and an open position, in which the seal plate is displaced from the orifice plate to open the valve.

20 Claims, 9 Drawing Sheets

(56) References Cited

U.S. PATENT DOCUMENTS

| | | | | |
|---|---|---|---|---|
| 4,669,660 | A | * | 6/1987 | Weber .................. B05B 17/0607 239/102.2 |
| 4,695,034 | A | * | 9/1987 | Shimizu ................ F16K 31/007 137/486 |
| 4,750,520 | A | * | 6/1988 | Heim ........................ F15C 5/00 137/625.33 |
| 4,768,751 | A | * | 9/1988 | Giachino ............ F02M 61/1853 239/102.1 |
| 4,907,748 | A | * | 3/1990 | Gardner ............. F02M 51/0603 239/584 |
| 5,054,522 | A | * | 10/1991 | Kowanz ............... B65D 90/587 137/625.28 |
| 5,085,399 | A | * | 2/1992 | Tsutsui ............... G05D 23/1393 251/129.06 |
| 5,251,871 | A | * | 10/1993 | Suzuki .................. F16K 31/025 137/625.33 |
| 5,582,208 | A | * | 12/1996 | Suzuki ..................... F16K 1/34 137/625.29 |
| 6,019,346 | A | * | 2/2000 | Miller ................... F16K 31/005 137/625.28 |
| 6,240,944 | B1 | | 6/2001 | Ohnstein et al. |
| 6,705,345 | B1 | | 3/2004 | Bifano |
| 6,986,365 | B2 | * | 1/2006 | Henning ................... F15C 5/00 137/625.28 |
| 8,132,594 | B2 | * | 3/2012 | Burkhart ............... F16K 31/025 137/625.65 |
| 8,245,727 | B2 | * | 8/2012 | Mooney .................... F16K 7/14 137/625.33 |
| 8,967,200 | B2 | * | 3/2015 | Hayashi ................ F16K 31/007 137/625.3 |
| 2010/0243076 | A1 | * | 9/2010 | Hayashi ..................... F16K 7/14 137/455 |
| 2013/0048898 | A1 | * | 2/2013 | Hayashi ................... F16K 47/00 251/337 |
| 2015/0345663 | A1 | | 12/2015 | Jiang et al. |

OTHER PUBLICATIONS

Robertson, J.K., and Wise, K.D., "A Low Pressure Micromachined Flow Modulator", Sensors and Actuators, vol. 71, No. 1-2, Nov. 1998, pp. 98-106.

Chakraborty, I., Tang, W. C., Bame, D. P., and Tang, T. K., 2000, "MEMS micro-valve for space applications", Sensors and Actuators A, vol. 83, Nos. 1-3, pp. 188-193.

Shoji, S., and Esashi, M., "Microflow Devices and Systems" Journal of Micromechanics and Microengineering, vol. 4, No. 4, Nov. 1994, pp. 157-171.

Bosch, D., Heimhofera, B., Mücka, G., Seidela, H.,Thumsera, U., and Welsera, W., "A Silicon Microvalve with Combined Electromagnetic/Electrostatic Actuation" Sensors and Actuators A, vol. 37-38, Jun. 1993, pp. 684-692.

Tang, W.C., Chakraborty, I., and Pyle, D., "Deep Reactive-Ion Etched Micro Valves for Spacecraft Propulsion," JPL TRS 1992+, Nov. 1998, California Institute of Technology, Jet Propulsion Laboratory, Pasadena, California.

Yang, E-H., Lee. C., "Piezoelectrically Actuated Microvalves for Micropropulsion Applications," Proceedings of ASME International Mechanical Engineering Congress and Exposition, Paper No. IMECE2002-33783, 2002, pp. 449-453.

Mueller, J., Chakraborty, I., Vargo, S., Bame, D., Marrese, C., and Tang, W., "MEMS Micropropulsion Activities at JPL," JPL TRS 1992+, Apr. 1999,Beacon e Space, Jet Propulsion Laboratory, Pasadena, California.

Kim, J-H., Na, K-H., Kang, C.J., Jeon, D., and Kim Y-S., "A Disposable Thermopneumatic-Actuated Microvalve Stacked with PDMS Layers and ITO-Coated Glass" Microelectronic Engineering, vol. 73-74, Jun. 2004, pp. 864-869.

Lee, C., Yang, E.H., Saeidi, S.M., and Khodadadi, M., "Fabrication, Characterization, and Computational Modeling of a Piezoelectrically Actuated Microvalve for Liquid Flow Control" Journal of Microelectromechanical Systems, vol. 15, No. 3, Jun. 2006, pp. 686-696.

Roberts, D.C., Li, H., Lodewyk, Steyn, L.J., Yaglioglu, O., Spearing, S.M., Schmidt, M.A., and Hagood, N.W., "A Piezoelectric Microvalve for Compact High-Frequency, High-Differential Pressure Hydraulic Micropumping Systems" Journal of Microelectromechanical Systems, vol. 12, No. 1, Feb. 2003, pp. 81-92.

Oh, K.W., Ahn, C.H., "A Review of Microvalves" Journal of Micromechanics and Microengineering, vol. 16, No. 5, May 2006, pp. R13-R39.

Chin, R., Hsiao-Wecksler, E.T., Loth, E., Kogler, G, Manwaring, S., Tyson, S.N., Shorter, K.A., and Gilmer, J., "A pneumatic power-harvesting ankle-foot-orthosis to prevent foot-drop" Journal of NeuroEngineering and Rehabilitation, vol. 6, No. 19, Jun. 2009, pp. 1-11.

Wijngaart, W., Thorsén, A., and Stemme, G., "A Seat Microvalve Nozzle for Optimal Gas-Flow Capacity at Large-Controlled Pressure" Journal of Microelectromechanical Systems, vol. 14, No. 2, Apr. 2005, pp. 200-206.

Henning, A.K., "Confirmation of Large-Periphery Compressible Gas Flow Model for Microvalves," Proceedings of SPIE, MEMS/MOEMS Components and Their Applications, vol. 5344, 2004, pp. 155-162.

Henning, A.K., "Improved Gas Flow Model for Microvalves," The 121h International Conference on Solid State Sensors, Actualors and Microsystems, Boston, 2003.

Henning, A.K., "Comprehensive Compressible Gas Flow Model for Microvalves," Feb. 2004, Submitted for review to Journal of Microelectromechanical Systems Redwood Microsystems Inc., Menlo Park, California, pp. 1-42.

Athavale, M.M., Yang, H.Q., and Przekwas, A.J., "Coupled Fluid-Thermal-Structural SimulationsIn Microvalves and Microchannels," Technical Proceedings of the 1999 International Conference on Modeling and Simulation of Microsystems, MSM, 199, pp. 570-573.

White, J., "Fabrication of Polysilicon Micro Valve Array," 22rd Annual Microelectronic Engineering Conference, 2004.

Hauke, G., "An Introductuion to Fluid Mechanics and Transport Phenomena," Fluid Mechanics and Its Applications, 2nd edition, Springer, Dordrecht, 2008, 30 pages.

Gad-el-Hak, M., "The Fluid Mechanics of Microdevices—The Freeman Scholar Lecture" Journal of Fluid Engineering, vol. 121, No. 1, Mar. 1999, pp. 5-33.

Ho, C-M., and Tai, Y-C., "Micro-Electro-Mechanical-Systems (MEMS) and Fluid Flows" Annual Review of Fluid Mechanics, vol. 30, Jan. 1998, pp. 579-612.

Mueller, J., Vargo, S., Forgrave, J., Bame, D., Chakraborty, I., and Tang, W., "Development of a Micro-Isolation Valve" AIAA 99-2726, Jet Propulsion Laboratory, Pasadena, California. No date.

Fazal, I., Louwerse, M.C., Jansen H.V., and Elwenspoek, M.C., "Design, Fabrication and Characterization of a Novel Gas Microvalve Using Micro-Fine-Machining" Journal of Micromechanics and Microengineering, vol. 16, No. 7, Jul. 2006, pp. 1207-1214.

Ramanamurthy, P.V.M., Ahrens, R., and Karmalkar, S., "Piezoelectric Microvalve" Indian Journal of Pure and Applied Physics, vol. 45, Apr. 2007, 278-281.

Tikka, A.C., Al-Sarawi, S.F., and Abbott, D., "Modelling a Surface Acoustic Wave Based Remotely Actuated Microvalve" Smart Materials and Structures, vol. 18, No. 4, Apr. 2009, pp. 1-8.

Wu, X., Kim, S-H., Ji, C-H., and Allen, M.G., "A Piezoelectrically-Driven High Flow Rate Axial Polymer Microvalve with Solid Hydraulic Amplification," 21st International Conference on Micro Electro Mechanical Systems, IEEE, 2008, pp. 523-526.

Park, J.M., Taylor, R.P., Evans, A.T., Brosten, T.R., Nellis, G.F., Klein, S.A., Feller, J.R., Salerno, L., and Gianchandani, Y.B., "A Piezoelectrically Actuated Ceramic-Si-Glass Microvalve for Distributed Cooling Systems," Solid-State Sensors and Actuators Workshop, Hilton Head 06, 2006, pp. 248-251.

Park, J.M., Evans, A.T., Rasmussen, K., Brosten, T.R., Nellis, G.F., Klein, S.A., Gianchandani, Y.B., "A Microvalve with Integrated

(56) References Cited

OTHER PUBLICATIONS

Sensors and Customizable Normal State for Low-Temperature Operation" Journal of Microelectromechanical Systems, vol. 18, No. , Aug. 2009, pp. 868-877.

Mueller, J., "A Review and Applicability Assessment of MEMS-Based Microvalve Technologies for Microspacecraft Propulsion," Progress in Astronautics and Aeronautics, American Institute of Astronautics and Aeronautics, vol. 147, 2000, pp. 449-467.

Yang, E-H., Lee, C., and Mueller, J., "Normally-Closed, Leak-Tight Piezoelectric Microvalve under Ultra-High Upstream Pressure for Integrated Micropropulsion," The 16th Annual International Conference on Micro Electro Mechanical Systems, IEEE, 2003, pp. 80-83.

Kim, H., In, C., Yoon, G., and Kim, J., 2005, "A Slim Type Microvalve Driven by PZT Films", Sensors and Actuators A, vol. 121, pp. 162-171.

Park, J. M., Taylor, R. P., Evans, A. T., Brosten, T. R., Nellis, G. F., Klein, S. A., Feller, J. R., Salerno, L., and Gianchandani, Y. B., 2008, "A Piezoelectric Microvalve for Cryogenic Applications", Journal of Micromechanics and Microengineering, vol. 18, Jan. 2008, Paper #015023, pp. 1-10.

Lee, Dong G., Shin, Daniel D., Carman, Gregory P., "Large flow rate/high frequency microvalve array for high performance actuators", Sensors and Actuators A 134 (2007) pp. 257-263.

Fikru, N., and Chase, Thomas R., "A Review of MEMS based Pneumatic Valves" Conference paper, Mechanical Engineering Department, University of Minnesota, pp. 271-282, no date.

Yang, E.-H., Lee, C., Mueller, J., and George, T., 2004, "Leak-Tight Piezoelectric Microvalve for High-Pressure Gas Micropropulsion", Journal of Microelectromechanical Systems, vol. 13, No. 5, pp. 799-807.

Braun, S., Haasl, S., Sadoon, S., Ridgeway, A.S., van der Wijngaart, W., and Stemme, G., "Small Footprint Knife Gate Microvalves for Large Flow Control," The 13th International Conference on Solid-State Sensors and Actuators and Microsystems, Transducers 05 IEEE, vol. 1, 2005, 329-332.

Liu, Y., Kohl, M., Okutsu, K., and Miyazaki, S., "A TiNiPd Thin Film Microvalve for High Temperature Applications" Materials Science and Engineering A, vol. 378, No. 1-3, Jul. 2004, 205-209.

Huff, M.A., Mettner, M.S., Lober, T.A., and Schmidt, M.A., "A Pressure-Balanced Electrostatically-Actuated Microvalve," Solid-State Sensor and Actuator Workshop, IEEE Technical Digest, vol. 4, 1990, 123-127.

Messner, S., Schaible, J., Vollmer, J., Sandmaier, H., and Zengerle, R., "Electrostatic Driven 3-Way Silicon Microvalve for Pneumatic Applications," The 16th Annual International Conference on Micro Electro Mechanical Systems, IEEE, 2003, pp. 88-91.

Kim, H., and Najafi, K., "Electrostatic Hydraulic Three-Way Gas Microvalve for High-Pressure Applications," Twelfth International Conference on Miniaturized Systems for Chemistry and Life Sciences, µTAS '08, 2008, 369-371.

Bae, B., Han, J., Masel, R.I., and Shannon, M.A., "A Bidirectional Electrostatic Microvalve with Microsecond Switching Performance" Journal of Microelectromechanical Systems, vol. 16, No. 6, Dec. 2007, pp. 1461-1471.

Zhang, Q., Pekas, N., and Juncker, D., "Design and Fabrication of Novel Compliant Electrostatically Actuated Microvalves" Advanced Materials Research, vol. 74, 2009, pp. 179-182.

Esashi, M., Shoji, S., and Nakano, A., "Normally-Closed Microvalve and Micropump Fabricated on a Silicon Wafer" Sensors and Actuators, vol. 20, Feb. 1989, pp. 163-169.

Viard, R., Talbi, A., Pernod, P., Preobrazhensky V., and Merlen, A., "Magnetostatic Microvalve for High Momentum Rate Pulsed Jet Generation" Procedia Chemistry, vol. 1, No. 1, Sep. 2009, pp. 421-424.

Yang, X., Grosjean, C., and Tai, Y-C., "Design, Fabrication, and Testing of Micromachined Silicone Rubber Membrane Valves" Journal of Microelectromechanical Systems, vol. 8, No. 4, Dec. 1999, pp. 393-402.

Carlen, E.T., and Mastrangelo, C.H., "Paraffin Actuated Surface Micromachined Valves," The 16th Annual International Conference on Micro Electro Mechanical Systems, IEEE, 2000, 5 pages.

Luque, A., Quero, J.M., Hibert, C., Flückiger, P., and Gañán-Calvo, A.M., "Integrable Silicon Microfluidic Valve with Pneumatic Actuation" Sensors and Actuators A, vol. 118, No. 1, Jan. 2005, pp. 144-151.

DunAn Microstaq, Inc., 2015, "Product Datasheet: silQflo™ Silicon Servo Valve", http://www.dmq-us.com.

Vandelli, N., Wroblewski, D., Velonis, M., and Bifano, T., "Development of a MEMS Microvalve Array for Fluid Flow Control" Journal of Microelectromechanical Systems, vol. 7, No. 4, Dec. 1998, pp. 395-403.

Shao, P., Rummler, Z., and Schomburg, W.K., "Polymer Micro Piezo Valve with a Small Dead Volume" Journal of Micromechanics and Microengineering, vol. 14, No. 2, Feb. 2004, pp. 305-309.

Park, J.M., Brosten, T.R., Evans, A.T., Rasmussen, K, Nellis, G.F., Klein, S.A., Feller, J.R., Salerno, L., and Gianchandani, Y.B., "A Piezoelectric Microvalve with Integrated Sensors for Cryogenic Applications," International Conference on Micro Electro Mechanical Systems MEMS 07, IEEE/ASME, 2007, 4 pages.

\* cited by examiner

FLUIDIC CONTROL VALVE WITH SMALL DISPLACEMENT ACTUATORS

CROSS-REFERENCE TO RELATED APPLICATION

The present application is based on and claims the benefit of U.S. provisional patent application Ser. No. 62/287,655, filed Jan. 27, 2016, the content of which is hereby incorporated by reference in its entirety.

GOVERNMENT FUNDING

This invention was made with government support under EEC-0540834 awarded by the National Science Foundation. The government has certain rights in the invention.

BACKGROUND

Embodiments of the present disclosure are directed to a fluidic control valve and, more specifically, to a valve which utilizes actuators having small displacements without the need for displacement amplification mechanisms. Some embodiments include components having both macro-scale and micro-scale features, such as features that are formed using micro-electromechanical systems (MEMS) device fabrication techniques. Fluidic control valves in accordance with other embodiments are also disclosed.

A microvalve is a miniature valve that controls the flow and/or pressure of a fluid passing through it. Inside the microvalve, the fluid flows through channels or orifices that are sized to a micrometer scale. Microvalves developed so far can be classified into two types: active and passive. Active microvalves utilize a powered actuator to control the opening and closure of the micro orifice or channel through which the fluid flows. Passive microvalves, on the other hand, have no actuator to control the fluid flow and are simply check valves operated by the pressure of the flowing fluid and its direction of flow. Passive microvalves are often used as part of micropumps. In contrast, active microvalves are usually free standing fluidic control devices.

The majority of active microvalves are used in pneumatic systems. Many of these valves are used in systems that require precision control of gas flow for biomedical and manufacturing processes. More recently, pneumatic active microvalves are seeing potential application in microspacecraft propulsion systems, where weight, volume and power savings are vital. Another promising application of pneumatic active microvalves is in human assist devices, where power consumption and weight should be minimized. A number of studies have also been conducted on microvalves for liquid applications. Most of these serve as check valves in micropumps or as valves in lab-on-a-chip and chemical analysis systems. However, despite continuous development for the past three decades, microvalves have seen limited commercial success due to difficulties in design such as pressure handling capacity, sealing and packaging.

Pneumatic valves utilizing piezoelectric actuators have recently entered the commercial market. Two variants on piezoelectric actuators are most commonly used: "piezostack" actuators and "piezobender" actuators. Piezostack actuators are composed of a stack of many layers of a piezoelectric material. They rely on the change in thickness of a piezoelectric material when a voltage is applied to produce a deflection. They produce relatively large forces but very small deflections. While variants of piezobender actuators exist, the most common is the "cantilevered piezobender". It consists of a cantilever beam which includes a piezoelectric layer applied to either the top or bottom of a passive layer. When the piezoelectric layer is actuated, the strain induced in the layer causes the beam to deflect as a cantilever beam in pure bending. (An alternative architecture consists of using a piezoelectric layer on both the top and bottom surfaces of the beam. One layer is activated to place it in tension, while the opposite layer is activated so as to place it in compression, causing a larger deflection of the beam.) Piezobenders produce larger deflections but very small forces relative to piezostacks.

Current pneumatic valves exploit the benefits of these piezoelectric actuators. The Viva actuator of Parker Hannifin Corporation utilizes a piezostack actuator. This actuator requires the inclusion of a mechanical motion amplifier to increase the very small motion of the piezostack into a motion large enough to be useful with a single orifice.

Another pneumatic valve is the "VEMR" or "VEMC" series by Festo, which utilize cantilevered piezobenders rather than piezo stacks to achieve an actuator motion large enough to work with a single orifice. The use of piezobenders generally prevents the use of the valve as a proportional valve at high differential pressures (e.g., above 4 bar).

SUMMARY

Embodiments of the present disclosure are directed to a fluidic control valve and, more specifically, to a valve which utilizes one or more actuators having small displacements, such as one or more piezostack actuators, without the need for displacement amplification mechanisms. Some embodiments include components having both macro-scale and micro-scale features, such as features that are formed using micro-electromechanical systems (MEMS) device fabrication techniques.

In some embodiments, the valve includes a piezostack actuator, a seal plate, and an orifice plate including a plurality of orifices. The piezostack actuator is configured to move the seal plate along a longitudinal axis between a closed position, in which the seal plate seals the orifices of the orifice plate and closes the valve, and an open position, in which the seal plate is displaced from the orifice plate to open the valve.

In some embodiments, the valve includes a plurality of piezostack actuators, a plurality of seal plates, and an orifice plate including a plurality of orifices. The piezostack actuators are each configured to move a corresponding one of the seal plates along a longitudinal axis between a closed position, in which the seal plate seals corresponding orifices of the orifice plate, and an open position, in which the seal plate is displaced from the orifice plate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
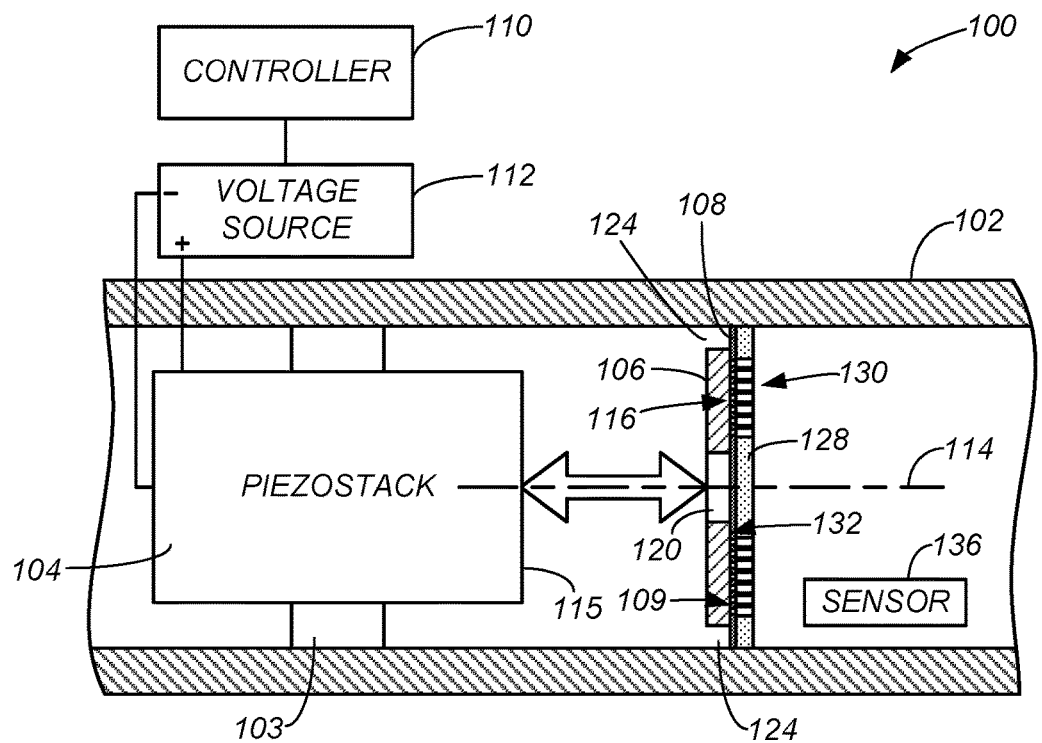
FIGS. 1 and 2 are simplified diagrams of a valve formed in accordance with embodiments of the present disclosure in closed and open states, respectively.

Embodiments of the present disclosure are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element, or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, embodiments of the present invention may be embodied as methods, systems, devices, and/or computer program products, for example. The computer program or software aspect of the present invention may comprise computer readable instructions or code stored in a computer readable medium or memory. Execution of the program instructions by one or more processors (e.g., central processing unit) results in the one or more processors performing one or more functions or method steps described herein. Any suitable patent subject matter eligible computer readable media or memory may be utilized including, for example, hard disks, CD-ROMs, optical storage devices, or magnetic storage devices. Such computer readable media or memory do not include transitory waves or signals.

The computer-usable or computer-readable medium or memory may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random axis memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention generally relate to a fluidic control valve or valve. Some embodiments of the valve are configured to provide proportional flow control. Embodiments of the valve may be used for pneumatic or hydraulic applications.

Figure 2:
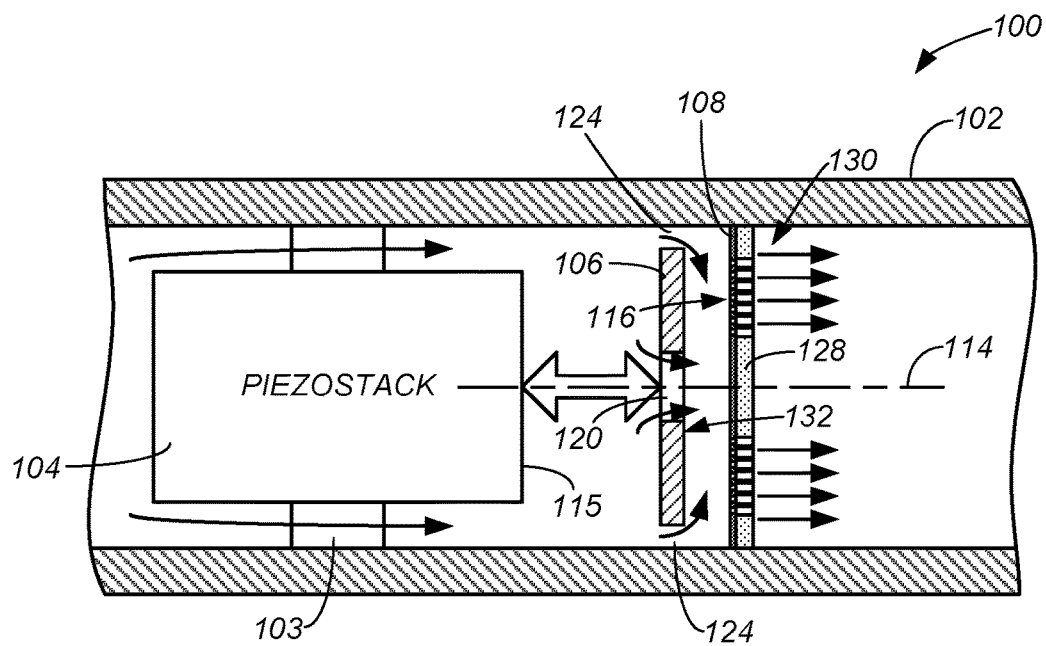

FIGS. 1 and 2 are simplified diagrams of a valve 100 formed in accordance with embodiments of the present disclosure in closed and open states, respectively. In some embodiments, the valve 100 includes or is mounted within a housing or conduit 102 that defines a fluid flow path, such as using a suitable bracket 103. When the valve 100 is in the closed state (FIG. 1), fluid flow through the conduit 102 is prevented, and when the valve 100 is in the open state, a flow of fluid is allowed to travel through the conduit 102, as indicated by the arrows in FIG. 2.

In some embodiments, the valve 100 comprises a piezostack or piezostack actuator 104, a seal plate 106, and an orifice plate 108. In some embodiments the valve 100 includes a controller 110 and a voltage supply 112. In some embodiments, the controller 110 represents one or more microprocessors and other circuit elements that are configured to control the voltage source 112 in response to the execution of program instructions, or an input, and facilitate the performance of one or more functions described herein. The program instructions may be stored in memory that is accessible by the one or more processors of the controller 110, such as local memory of the controller 110 or remote memory that is accessible through a network, for example.

The piezostack 104 is configured to expand and contract along a longitudinal axis 114 in response to the voltage supplied by the voltage source 112. When in an expanded state (FIG. 1), an end 115 of the piezostack 104 presses the seal plate 106 against the orifice plate 108. This seals the plurality of orifices 116 of the orifice plate 108 and places the valve 100 in the closed position, as shown in FIG. 1. When the piezostack 104 is in a contracted state, the seal plate 106 is displaced from the orifice plate 108 and fluid can flow through the plurality of orifices 116 of the orifice plate 108 and through the conduit 102, as shown in FIG. 2. In some embodiments, the piezostack 104 may be placed in states between the contracted and expanded states to allow for proportional control of the flow of fluid through the conduit 102.

The piezostack 104 requires low actuation power. The piezostack 104 is a capacitive device that requires near zero power to hold it in a specified position, regardless of whether that position is fully closed (FIG. 1), fully open (FIG. 2), or anywhere in between. This provides advantages over conventional valves that utilize a magnetic actuator, as such actuators consume power constantly while being held at any position other than their default zero position. Therefore, the valve 100 utilizing the piezostack 104 saves substantial amounts of electric actuation energy compared to conventional magnetically actuated valves. Additionally, the operating temperature of the piezostack 104 does not noticeably increase when held at a constant position.

Exemplary piezostack actuators that may be suitable for uses as the piezostack 104 include those manufactured by Thorlabs Inc. (www.thorlabs.com), such as Item #PK2JUP1, Item #PK2FVP1, Item #PK2FVP2, Item #PK4GA3H5P2, Part #AE0505D16F, and Part #PZS001, or those manufactured by Piezo Systems, Inc. (www.piezo.com), such as Part #TS18-H5-202.

In some embodiments, the orifice plate 108 includes a plurality of orifices 116 that extend through the orifice plate 108. In some embodiments, the orifices 116 are substantially cylindrical and extend substantially parallel to the longitudinal axis 114 when the orifice plate 108 is oriented perpendicularly to the longitudinal axis 114, as shown in FIG. 1. Embodiments of the orifices 116 include orifices having a circular cross-sectional shape, a rectangular cross-sectional shape or other shape.

Figure 3:
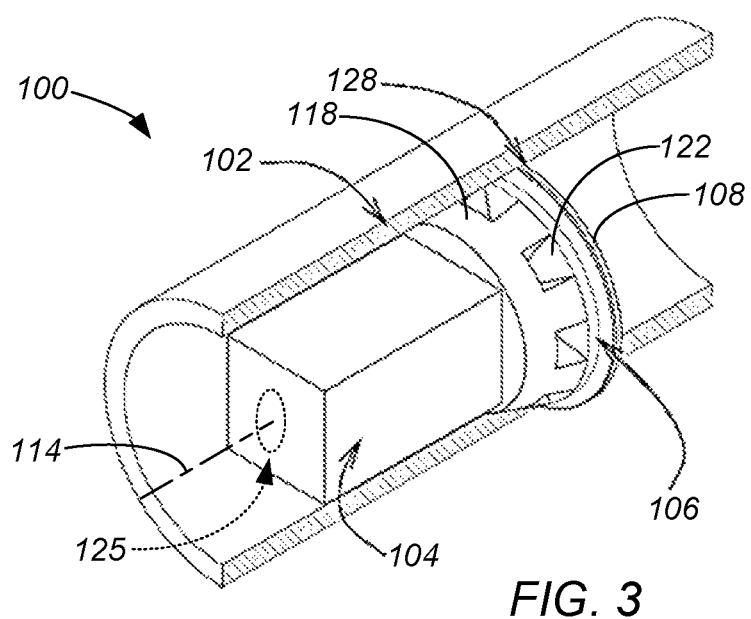
FIGS. 3-5 respectively show an isometric view of a valve within conduit with a portion of the conduit removed, an isometric exploded view of a valve, and an isometric cross-sectional view of a valve within conduit, in accordance with embodiments of the present disclosure.
Figure 4:
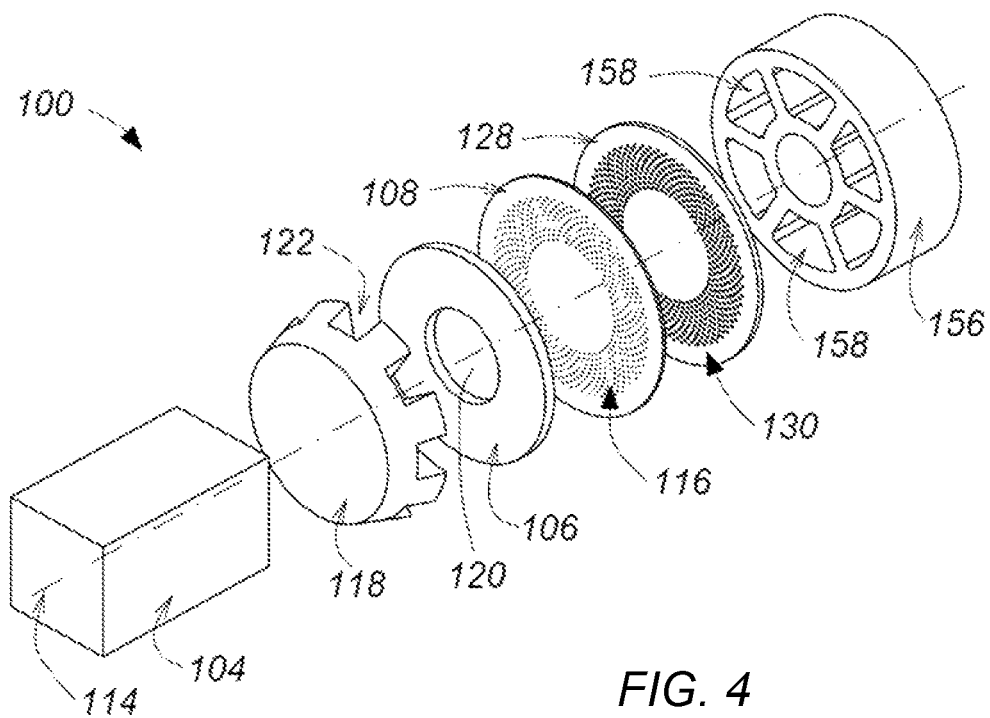
Figure 5:
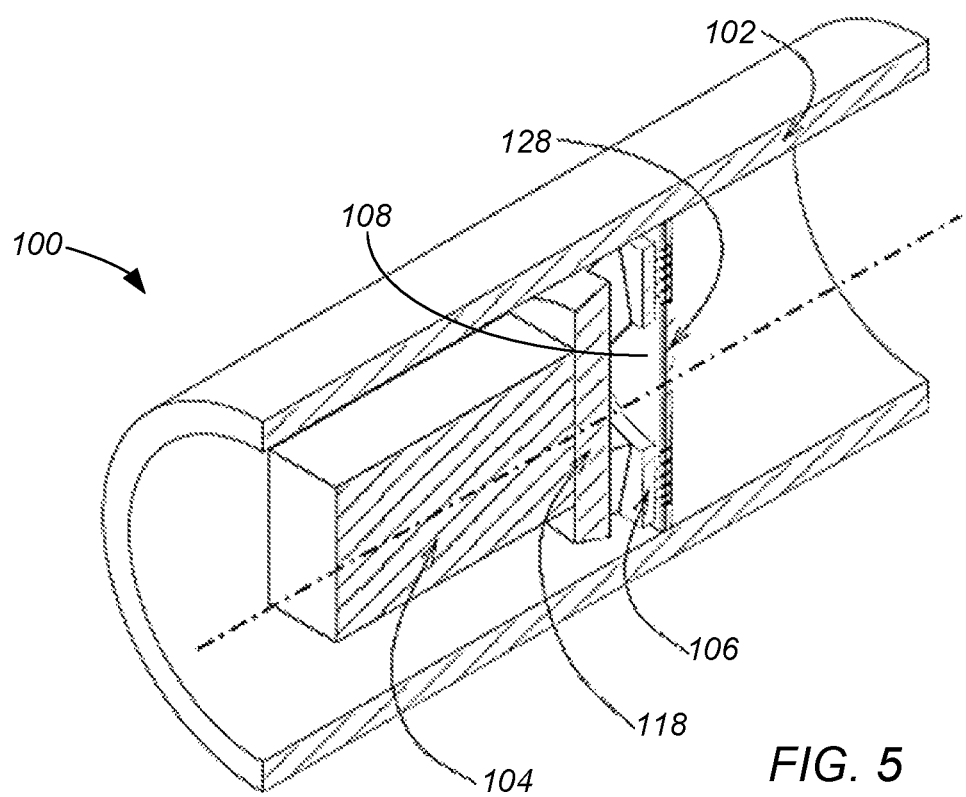

FIGS. 3-5 respectively show an isometric view of an exemplary valve 100 formed in accordance with embodiments of the present disclosure within the conduit 102 with a portion of the conduit 102 removed, an isometric exploded view of elements of the valve 100, and an isometric cross-sectional view of the valve 100 within the conduit 102.

In some embodiments, the valve 100 includes a seal plate carrier 118 that is positioned between the piezostack 104 and the seal plate 106. Expansion and contraction of the piezostack 104 along the longitudinal axis 114 drives the seal plate carrier 118 and the attached seal plate 106 along the longitudinal axis 114 either toward or away from the orifice plate 108. In some embodiments, the seal plate 106 includes a central opening 120 and the seal plate carrier 118 includes one or more passages 122. The passages 122 allow for fluid to flow through the central opening 120 when the valve 100 is in an open position (i.e., not closed), as indicated in FIG. 2. In some embodiments, a radial gap 124 extends between the seal plate 106 and the conduit 102, through which fluid can flow when the valve 100 is in an open position, as indicated in FIG. 2. In some embodiments, the direction of fluid flow is the reverse of that shown in FIG. 2.

In some embodiments, the piezostack actuator 104 includes a center hole 125 through which fluid may flow to the central opening 120 of the seal plate 106, as indicated in phantom lines in FIG. 3. This embodiment of the valve 100 does not require the seal plate carrier 118. One suitable piezostack 104 that includes a center hole is the Thorlabs PK4GA3H5P2 piezostack.

In some embodiments, the valve 100 does not utilize a mechanical motion amplifier to increase the very small motion of the piezostack 104 along the longitudinal axis 114. In some embodiments, the displacement of the seal plate 106 along the axis 114 relative to the orifice plate 108 has a 1:1 ratio to the movement of the piezostack 104 along the longitudinal axis 114. That is, movement of the piezostack 104 is directly translated to movement of the seal plate 106 along the axis 114. Thus, each micron of movement of the end 115 of the piezostack 104 causes a micron of movement of the seal plate 106.

In some embodiments, the orifice plate 108 includes an array of micro-scale orifices 116 rather than a single, large orifice, as in conventional valves. The diameter of each of the orifices 116 is sized to be approximately four times the maximum displacement of the end 115 of piezostack 104 along the longitudinal axis 114. For example, if the piezostack 104 is capable of a 15 micron deflection, then the orifices 116 are sized to have a diameter of approximately 40-60 microns each. The basis of this is that the flow area around the periphery of the orifice 116 times the displacement of the end 115 of piezostack 104 will match the area of the orifice when the end 115 of the piezostack 104 is displaced 25% of the diameter of the orifices 116 from the plate 108. The number of orifices 116 is selected to produce a summed area equal to the desired area of a single, equivalent orifice. For example, the flow capacity of a single orifice having a diameter of 1.25 mm would be approximately equaled by an array of 630 orifices each having a diameter of 50 microns.

In some embodiments, the orifices 116 have a diameter of about 10 microns to about 500 microns, including more specific ranges of 10 microns to 50 microns, less than 50 microns, less than 100 microns, less than 150 microns, less than 200 microns, less than 250 microns, less than 300 microns, less than 350 microns, less than 400 microns, less than 450 microns, and less than 500 microns. In some embodiments, the orifices 116 are fabricated using a micromachining process.

In some embodiments, the orifice plate 108 includes 20 or more orifices 116, such as 20-5,000 orifices 116. In more specific embodiments, the orifice plate 108 includes more than 30 orifices 116, more than 50 orifices 116, and more than 100 orifices 116.

In some embodiments, a circular opening having an area that is equivalent to the total area of the orifices 116 has a diameter that is larger than four times the displacement of the end 115 of piezostack 104 along the longitudinal axis 114 or the distance the piezostack 104 displaces the seal plate 106 from the orifice plate 108, when in the open position, such as a full open position (e.g., maximum displacement).

In some embodiments, the number of orifices 116 is selected to be equal to or exceed the area of a single, equivalent circular orifice divided by the product of the perimeter of each orifice 116 times the maximum displacement of the piezostack 104. For example, the flow capacity of a single orifice having a diameter of 1.25 mm would be approximately equaled by an array of 130 orifices 116 each having a diameter of 200 microns if the maximum displacement of piezostack 104 is 15 microns. In some embodiments, the diameter of the orifices 116 in orifice plate 108 may be large enough so that they can be machined using conventional machining processes rather than micromachining.

In some embodiments, the orifice plate 108 is thin. In some embodiments, the orifice plate 108 has a thickness, through which the orifices 116 extend, that is less than approximately 300 microns, such as about 50 to about 250 microns. Other thicknesses for the orifice plate 108 may also be used, such as greater than 500 microns, and greater than 1 mm, for example. For relatively thick versions of the orifice plate 108 (e.g., thickness of greater than 500 microns), the support plate described below may be unnecessary.

In some embodiments, the valve 100 includes a support plate 128 that supports the orifice plate 108, as shown in FIGS. 1-5. The orifice plate 108 and the support plate 128 may be formed of any suitable material, such as stainless steel or aluminum, for example. In some embodiments, the orifice plate 108 and/or the support plate 128 are formed of silicon. This allows the plates 108 and 128 to be micromachined using processes that are well established for fabricating MEMS devices. Silicon also adapts well to eutectic bonding, which can be used to bond the orifice plate 108 to the support plate 128. In some embodiments, other bonding methods may be used.

The support plate 128 generally overcomes two challenges. The first challenge stems from the fact that the depth to which an approximately 50-micron hole can be etched is limited. This first challenge is surmounted by reducing the thickness of the orifice plate 108 containing the small orifices 116. The second challenge is making the orifice plate 108 containing the array of the orifices 116 strong enough to withstand the operating pressure applied across it. As mentioned above, the plates 108 and 128 may each be formed of silicon and can be micro-machined using established MEMS fabrication techniques. However, silicon is a brittle material. In addition, the tiny orifices 116 act as stress concentrators, further lowering the strength of the orifice plate 108. The second challenge is surmounted by mounting the orifice plate 108 on the thicker support plate 128 containing the orifices 130 having 2-5 times the diameter of the holes 116 in the orifice plate 108. It then becomes feasible to etch the larger diameter holes 130 through the thicker plate 128, and the larger holes 130 induce lower levels of stress concentration. Therefore, the combination of the orifice plate 108 with the support plate 128 can be designed to withstand the total intended operating pressure differential.

In some embodiments, the support plate 128 is positioned on a downstream side of the orifice plate 108 relative to the direction of fluid flow through the conduit 102, as illustrated in FIGS. 1-5. Alternatively, the support plate 128 may be located on the upstream side of the orifice plate 108 relative to the direction of flow through the conduit 102. In this alternative embodiment, the seal plate 106 is configured to seal the orifices 130 of the support plate 128 when the valve 100 is in the closed state.

The thickness of the support plate 128 measured along the longitudinal axis 114 is generally much thicker than the orifice plate 108 to provide the necessary support for the orifice plate 108. In some embodiments, the support plate 128 has a thickness of more than 500 microns. However, other thicknesses of the support plate 128 may also be used. In some embodiments, the support plate 128 comprises multiple plates that are stacked together to the desired thickness.

In some embodiments, the support plate 128 is stiffened using any suitable conventional technique. In some embodiments, the support plate 128 includes webbing or ribs on the opposing side from the seal plate 106 to increase its stiffness.

In some embodiments, a support plate frame 156 is positioned on a downstream side of the orifice plate 108, as shown in FIG. 4. The support plate frame 156 may support or replace the support plate 128, and operates to reduce the deflection of the orifice plate 108, and the support plate 128 (if present). The frame 156 may be integrally formed with the orifice plate 108 and/or the support plate 128. Reducing the deflection of the orifice plate 108 reduces the possibility of leakage through the valve 100 at or near the closed state. Reducing the deflection also lowers the stresses in the orifice plate 108 and the optional support plate 128. In some embodiments, the support plate frame 156 includes one or more passages 158 that extend through the frame 156 substantially parallel to the longitudinal axis 114. The passages 158 allow fluid to flow downstream through orifices 116 in the orifice plate 108 and through the orifices 130 in the optional support plate 128.

In some embodiments, the support plate 128 includes at least one opening or orifice 130 that is aligned with orifices 116 of the orifice plate 108 and allows fluid flowing through the orifices 116 to pass through the support plate 128. In some embodiments, the support plate 128 includes a plurality of orifices 130, each of which is aligned with one or more of the orifices 116 of the orifice plate 108. Thus, in some embodiments, one of the orifices 130 may provide an opening through which fluid traveling through two or more of the orifices 116 may flow. In some embodiments, each of the plurality of the orifices in the support plate 128 corresponds to one of the orifices 116 of the orifice plate 108. Thus, in some embodiments, the support plate 128 includes an array of orifices 130 that directly correspond to the array of orifices 116. Accordingly, in some embodiments, the array of the orifices 130 of the support plate 128 has a pattern that matches the pattern of the array of the orifices 116 of the orifice plate 108. In some embodiments, the arrays of the orifices 116 and the orifices 130 have a circular pattern, as shown in FIG. 4. Other patterns of the arrays of the orifices 116 and 130 may also be used.

The circular pattern of the orifices 116 is desired to minimize the distance between the edge of the seal plate 106 and the innermost orifice 116. For example, if the orifices 116 are arranged in a rectangular grid pattern and are sealed with a square seal plate 106, the minimum distance from the edge of the seal plate 106 to the innermost orifice 116 will be increased significantly. Optionally, pockets can be etched into the sealing face of the seal plate 106 outside the area that covers the orifices 116, and/or pockets can be etched into the sealing face of the orifice plate 108 outside of the immediate area around orifices 116, to further increase flow capacity through the orifices 116.

Due to the larger thickness of the support plate 128, the orifices 130 generally have a larger diameter than the orifices 116 of the orifice plate 108. In some embodiments, the orifices 130 each have a substantially larger diameter than the orifices 116, such as 2 to 5 times the diameter of each of the orifices 116.

In some embodiments, the orifices 116 are etched from one side of the orifice plate 108. This generally requires a very thin orifice plate 108. In some embodiments, the valve 100 includes the support plate 128 to provide the necessary support for the thin orifice plate 108, such as discussed above and shown in FIGS. 1-5.

In some embodiments, the orifices 116 which extend through orifice plate 108 may be fabricated by etching the orifices 116 extending substantially parallel to center axis 114 partially through the orifice plate 108 into the downstream face of the orifice plate 108, then etching the remaining depth of the orifices 116 substantially parallel to center axis 114 on the upstream face of the orifice plate 108. This fabrication technique for etching the orifices 116 eliminates stress concentrations attributable to roughness on the far end of orifices 116 if they are etched from a single side of orifice plate 108. In some embodiments, the above process may be initiated on the upstream face and completed on the downstream face. In some embodiments, the procedure for fabricating the orifices in orifice plate 108 described earlier in this paragraph may be used to fabricate the orifices in the support plate 128.

In some embodiments, the orifice plate 108 and/or support plate 128 are supported in a fixed position relative to the conduit 102, while the end 115 of the piezostack 104 may move relative to the conduit 102 along the axis 114. The plates 108 and 128 may be supported in an assembly that is mounted to the conduit 102, or supported through another suitable arrangement.

Thus, some embodiments of the valve 100 include machined or otherwise bulk fabricated ("meso-scale") components with micro-machined ("MEMS-scale" or "micro-scale") components. More specifically, the piezostack 104 and the seal plate 106 are fabricated using conventional manufacturing processes, while the orifice plate 108 and the support plate 128 are fabricated using MEMS micro-machining or fabrication processes. It is noted that the seal plate 106 may also be fabricated using conventional manufacturing or micro-machining processes. As mentioned above, other exemplary embodiments of the valve include macro-scale orifices 116 in the orifice plate 108, and macro-scale orifices 130 in the support plate 128.

The use of the arrays of orifices 116 and 130 makes it possible to greatly reduce the distance the seal plate 106 must be displaced along the longitudinal axis 114 from the orifice plate 108 to fully open the valve 100 while still yielding macro-scale flow rates, such as 1-500 slpm for a pressure drop of 6 to 5 bar. This is important because the piezostack 104 produces a very small deflection of the seal plate 106 along the longitudinal axis 114. Full flow through the valve 100 is achieved if the seal plate 106 is moved away from the orifice plate 108 by approximately 25% of the equivalent diameter of each orifice 116. Thus, for instance, when the orifice plate 108 includes an array of 630 orifices 116 each having a diameter of 50 microns, the piezostack 104 needs to move the seal plate 106 approximately 15 microns along the longitudinal axis 114 away from the orifice plate 108 to change the valve 100 from the fully closed position (FIG. 1) to the fully open position (FIG. 2), which can be achieved using the piezostack 104. However, if the valve utilized an equivalent single orifice of 1.25 mm in diameter instead of the array of the orifices 116, an actuator would be required to deflect the sealing component 300 microns to transition the valve from a fully closed state to a fully open state. Thus, the array of orifices 116 in place of single large orifice makes it possible to implement the valve 100 using the piezostack 104, without the need for motion amplification mechanisms to increase the displacement of the piezostack 104 along the longitudinal axis 114.

Another advantage to the valve 100 is that it can be operated at very high speeds. This is made possible due to the very small deflection that is required to transition the valve 100 between the fully closed state to the fully open state. In some embodiments, the valve 100 can achieve response times in the microsecond range, such as 100 microseconds.

Figure 6A:
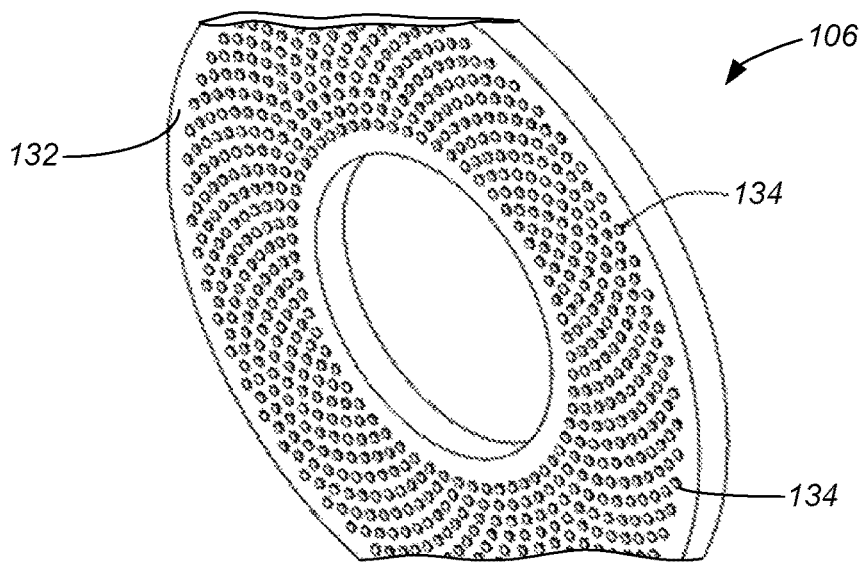
FIGS. 6A and 6B respectively show an isometric view of a seal plate in accordance with embodiments of the present disclosure, and a magnified isometric view of a portion of an orifice plate in accordance with embodiments of the present disclosure.

In some embodiments, the sealing face 132 of seal plate 106 is a substantially flat surface. In some embodiments, the sealing face 132 of the seal plate 106 includes a plurality of sealing bosses 134, as illustrated in the isometric view of the seal plate 106 provided in FIG. 6A. In some embodiments, each of the bosses 134 is configured to be aligned with one of the orifices 116 of the orifice plate 108 when the valve 100 is in the closed state (FIG. 1). In some embodiments, the sealing bosses 134 are larger than their corresponding orifices 116, such that they overlay their corresponding orifices 134. For example, in some embodiments, the diameter of each boss 134 is larger than the diameter of each orifice 116, or at least as large as the diameter of the corresponding orifice 116. For example, in some embodiments, if each orifice 116 has a diameter of 50 microns, then the bosses might be sized to 80 microns. Other diameters can be used. Pockets between the bosses increase the area for flow between the orifices 116 and the inner and outer edges of seal plate 106, thereby increasing the flow capacity of the valve and reducing throttling losses. Other pocket geometries can be used. In some embodiments, the bosses 134 are formed through a micro-machining process. In other embodiments, the sealing face 132 may include an elastomer layer that facilitates sealing the orifices 116 when the valve 100 is in the closed position. Alternatively or additionally, the sealing face 109 (FIG. 1) of the orifice plate 108 may include an elastomer layer.

Figure 6B:
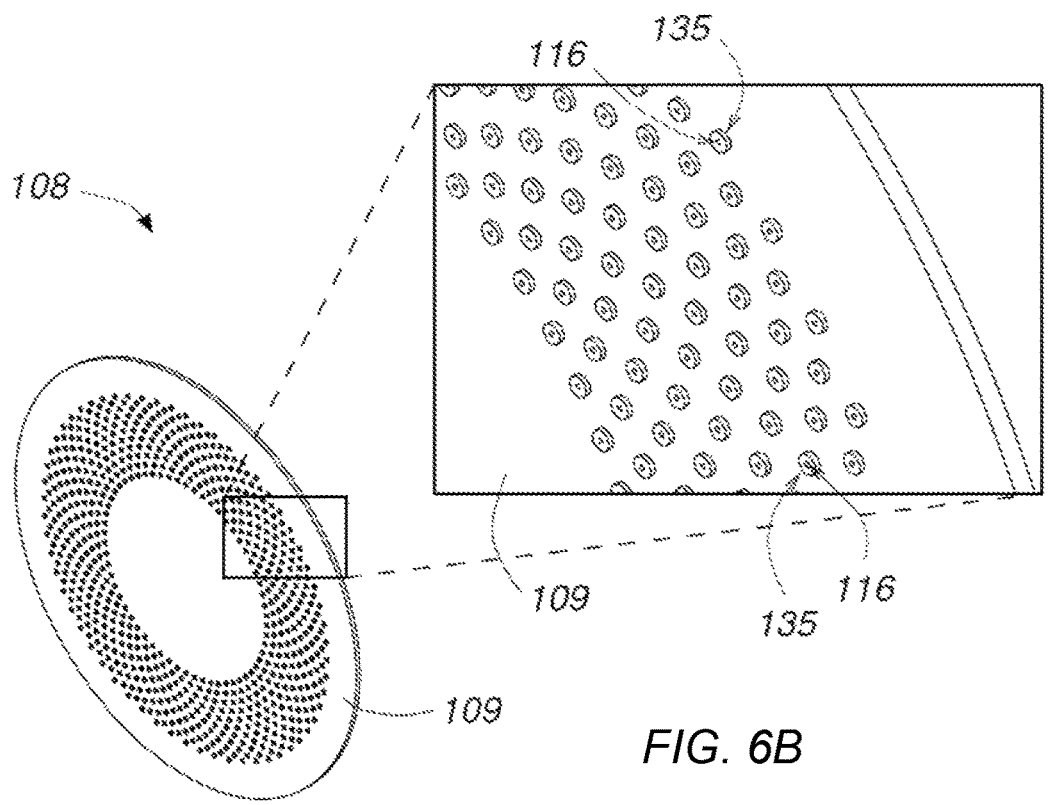

In some embodiments, the orifice plate 108 includes sealing bosses 135 that are each aligned with one of the orifices 116, as shown in FIG. 6B. In some embodiments, the sealing bosses 135 are positioned on a sealing face 109 of the orifice plate 118. In some embodiments, the diameter of each sealing boss 135 is larger than the diameter of each orifice 116. For example, in some embodiments, if each orifice 116 has a diameter of 50 microns, then the bosses might be sized to 150 microns. Pockets between the bosses increase the area for flow between the orifices 116 and the inner and outer edges of seal plate 106, thereby increasing the flow capacity of the valve and reducing throttling losses. Other pocket geometries can be used. In some embodiments, the bosses 135 are formed through a micro-machining process.

In some embodiments, the valve 100 includes a sensor 136 that is configured to detect the displacement between the seal plate 106 and the orifice plate 108, to allow for precise control of the displacement of the seal plate 106 from the orifice plate 108 using the controller 110. In some embodiments, the sensor 136 comprises a capacitive sensor. In some embodiments, the capacitive sensor 136 includes, for example, an electrically conductive coating or layer on the sealing face 132 of the seal plate 106, and one or more electrodes attached to or embedded within the orifice plate 108. Other suitable forms of the sensor 136 may also be used.

In some embodiments, the piezostack 104 defaults to an elongated state when in an unpowered state (i.e., zero or nominal voltage applied), and contracts when powered (i.e., voltage applied) to decrease the length of piezostack 104 when a voltage is applied to it. In this case, the exemplary embodiments of the valve 100 illustrated in FIGS. 1-5 would assume the closed state when the piezostack 104 is unpowered, and the valve 100 would assume an open state when sufficiently powered.

In some embodiments, the piezostack 104 defaults to a contracted state when in an unpowered state (i.e., zero or nominal voltage applied), and elongates or expands when powered to increase the length of piezostack 104 when powered (i.e., voltage applied). In this case, the exemplary embodiments of the valve 100 illustrated in FIGS. 1-5 would assume an open state when the piezostack 104 is unpowered, and the valve 100 would assume a closed state when sufficiently powered.

Figure 7:
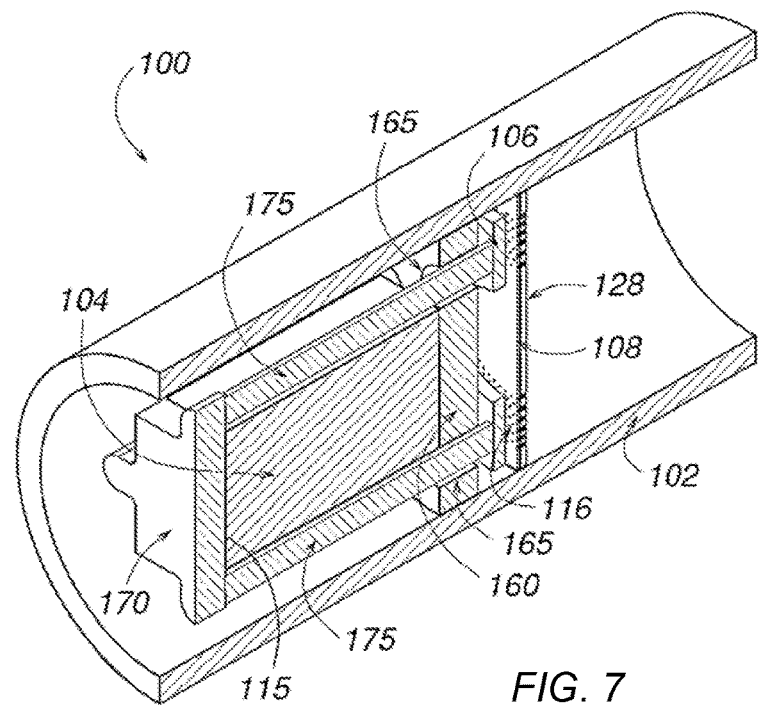
FIG. 7 is an isometric cross-sectional view of an exemplary valve in accordance with embodiments of the present disclosure.

FIG. 7 is an isometric cross-sectional view of an exemplary valve 100 that will assume the closed state when the piezostack 104 is unpowered and in a contracted state, and will assume an open state when the piezostack 104 is powered. The piezostack 104 is connected to a mount 160 having a fixed position relative to the orifice plate 108. The face 115 of the piezostack 104 extends away from the mount 160 when a voltage is applied to it. A strut mount 170 is connected to the face 115 of the piezostack 104, so it displaces longitudinally away from the orifice plate 108 when a voltage is applied to the piezostack 104. Struts 175 are connected to the strut mount 170 and pass through holes 165 in the mount 160. In some embodiments, the holes 165 in the mount 160 are larger than the cross-sectional area of the struts 175 so that fluid may also pass through the holes 165. In some embodiments, additional holes may be included in the mount 160 to allow additional cross-sectional areas for fluid flow. The struts 175 are connected to the seal plate 106. In some embodiments, the mount 160, the strut mount 170, the struts 175, and the seal plate 106 are positioned so that the seal plate 106 contacts the sealing face of the orifice plate 108 when no voltage is applied to the piezostack 104, sealing the plurality of the orifices 116 of the orifice plate 108 and placing the valve 100 in the closed position. Applying maximum voltage to the piezostack 104 fully displaces the seal plate 106 away from the orifice plate 108, fully opening the valve 100 for fluid flow through the orifices 116 in the orifice plate 108, which may be supported by the support plate 128, in accordance with one or more embodiments described above.

In some embodiments, the coefficient of thermal expansion of the material used for struts 175 may be chosen to minimize the effects of temperature changes on valve performance. In other words, if a change in temperature causes the piezostack to elongate by length δ, then a strut material is chosen so that the struts also elongate by length δ, thereby cancelling the effect of the change in length of the piezostack. In some embodiments, the distance between the sealing face 132 of the seal plate 106 and the sealing face 109 of the orifice plate 108 may be adjustable so that the seal plate 106 may be precisely positioned to fully close the orifices 116 in the orifice plate 108 when the piezostack 104 is unpowered.

In some embodiments, the piezostack 104 may be placed in states between the fully contracted and fully expanded states to allow for proportional control of the flow of fluid through the conduit 102 based on the voltage that is applied to the piezostack 104. Thus, embodiments of the valves described herein may be opened to varying degrees to allow for variable flow rates through the valves. Since the piezostack 104 is a capacitive device, it only consumes power when moving (if power leakage is disregarded). Thus, the piezostack 104 nominally does not consume any power when held at a fixed position based on an applied voltage.

For example, when a threshold voltage is applied to the piezostack 104 of the valve 100 of FIGS. 1 and 2, the seal plate 106 moves from the closed position (FIG. 1) a certain distance from the orifice plate 108, which allows for a certain flow rate of fluid through the valve 100. An increase in the voltage applied to the piezostack 104 of the valve 100 causes the seal plate 106 to move further away from the orifice plate 108, and increases the flow rate of fluid through the valve 100. Thus, the voltage that is applied to the piezostack 104 may be adjusted to various levels to change the rate of fluid flow through the valve 100 from a zero flow rate to a maximum flow rate.

Figure 8:
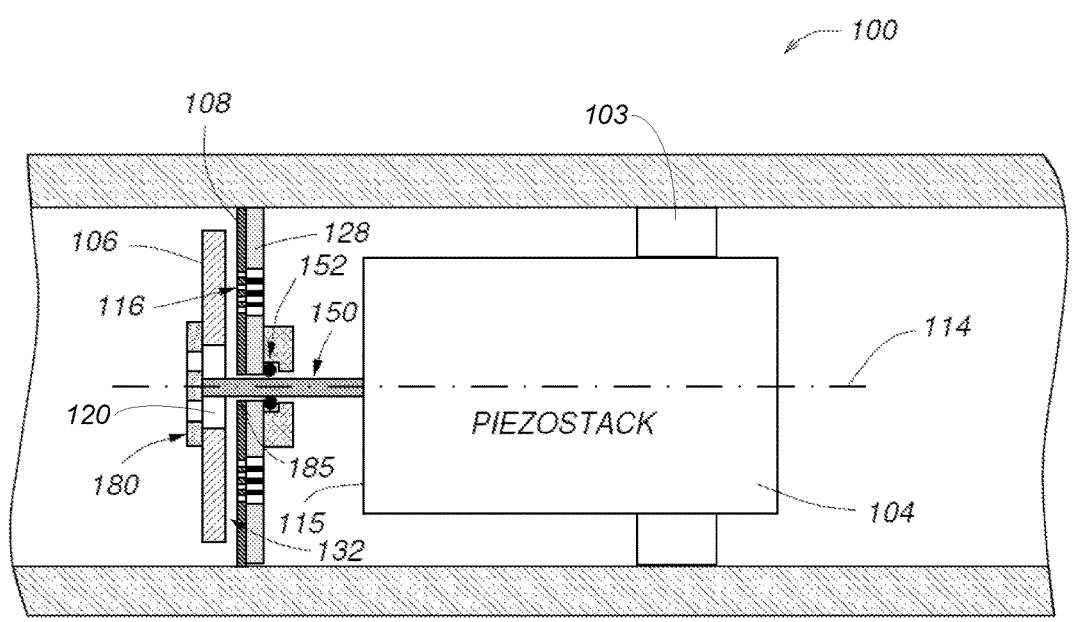
FIG. 8 is a side cross-sectional view of a valve in accordance with embodiments of the present disclosure.

FIG. 8 is a side cross-sectional view of an exemplary valve 100, which assumes a closed position when the piezostack 104 is unpowered and is in a contracted state. Thus, the piezostack 104 elongates rather than contracts when a voltage is applied to it. FIG. 8 illustrates the valve 100 in a state where a voltage is applied to the piezostack 104, so the piezostack 104 is elongated and the valve 100 is in the open state. In this case, the face 115 of the piezostack 104 displaces longitudinally along the axis 114 in response to the elongation of the piezostack 104, which also displaces a shaft 150 longitudinally along the axis 114. In some embodiments, a portion of the piezostack 104 is attached to the conduit 102, such as through an appropriate bracket 103, as shown in FIG. 8. The shaft 150 is connected to the seal plate carrier 180, which is attached to the seal plate 106. Thus, movement of the shaft 150 along the axis 114 also moves the seal plate 106 along the axis 114 relative to the orifice plate 108 and the support plate 128, which are fixed relative to the conduit 102. Expansion of the piezostack 104 displaces the seal plate 106 from the orifice plate 108 to open the valve 100 and allow fluid to flow through the orifices 116 and the conduit 102, and contraction of the piezostack 104 drives the seal plate 106 against the orifice plate 108 to seal the orifices 116 and close the valve 100.

In some embodiments, the seal plate carrier 180 may include passages to allow fluid to pass through it and into the center hole 120 of the seal plate 106. If no voltage is applied to piezostack 104, the face 115 of the piezostack 104 moves to the right in FIG. 8, displacing the shaft 150 and the seal plate carrier 180 and the seal plate 106 to the right to the point where the sealing face 132 of the seal plate 106 contacts the surface of the orifice plate 108, blocking flow through the orifices 116 and closing the valve 100. In some embodiments, the orifice plate 108 and the support plate 128 each include a hole 185, through which the shaft 150 passes. A seal 152 between the support plate 128 and the shaft 150 prevents fluid flow through the hole 185. In other embodiments, the seal 152 may be included between the orifice plate 108 and the shaft 150.

Additional embodiments are directed to a valve 200 having a plurality of piezostack actuators 104 and seal plates 106. Such a valve allows for precise control of multiple flow rates through the selective actuation of the piezostack actuators 104. Exemplary embodiments of the multi-piezostack actuator valve 200 will be described with references to FIGS. 9-13. FIGS. 9-12 illustrate simplified diagrams of multi-piezostack actuator valve 200 in various states of operation. FIG. 13 is an isometric view of an exemplary multi-piezostack actuator valve 200 within a flow conduit 102, a portion of which is cut away to expose the valve 200.

In general, the valve 200 includes a plurality of the piezostack actuators 104 and other components that are generally formed in accordance with one or more embodiments described above regarding the valve 100. Each of the piezostack actuators 104 controls the movement of a corresponding seal plate 106 along the longitudinal axis 114 between closed and open positions. When the seal plates 106 are in their closed position, they seal an array of orifices 116 of an orifice plate 108, which may be supported by the support plate 128, in accordance with one or more embodiments described above with regards to the valve 100. By selectively transitioning the seal plates 106 from their closed position to their open position using the corresponding piezostack 104, the valve 200 can increment the flow rate of fluid through the conduit 102.

Figure 9:
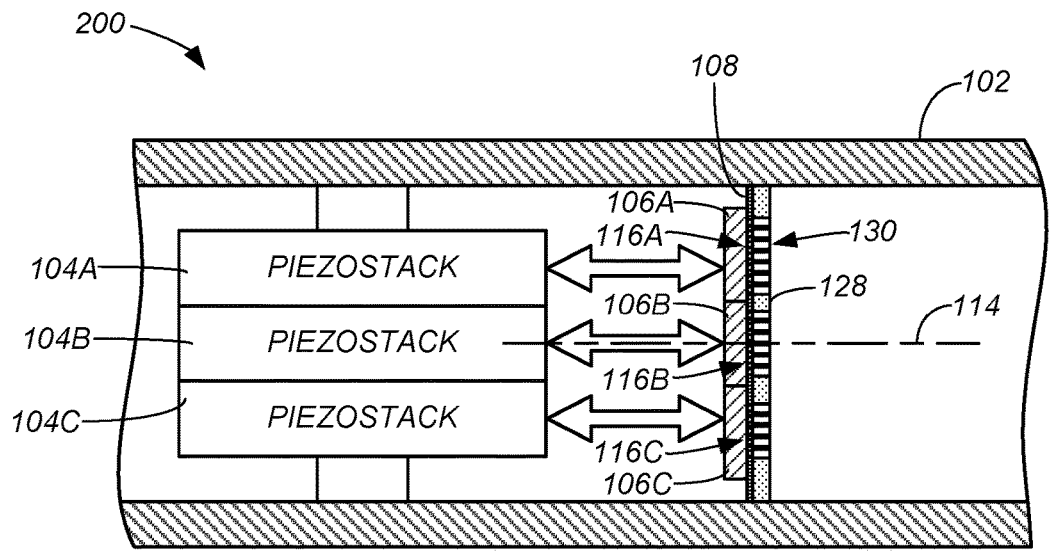
FIGS. 9-12 illustrate simplified diagrams of a multi-piezostack actuator valve in accordance with embodiments of the present disclosure in various states of operation.
Figure 10:
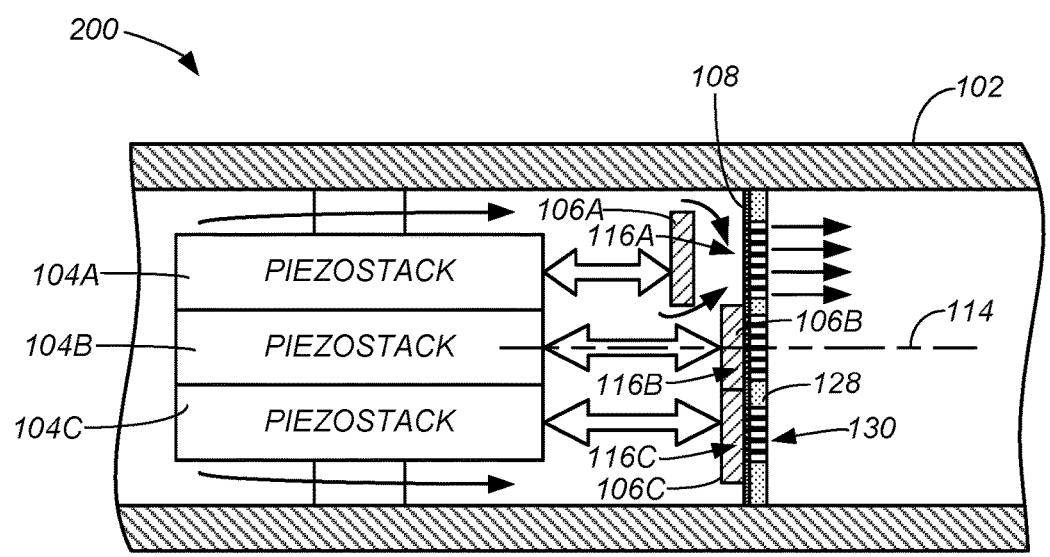
Figure 11:
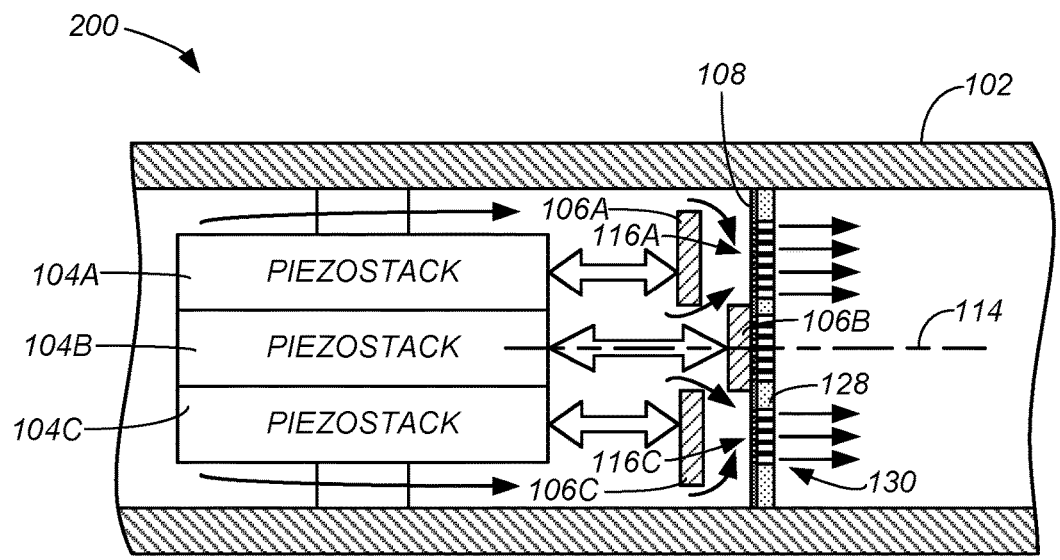
Figure 12:
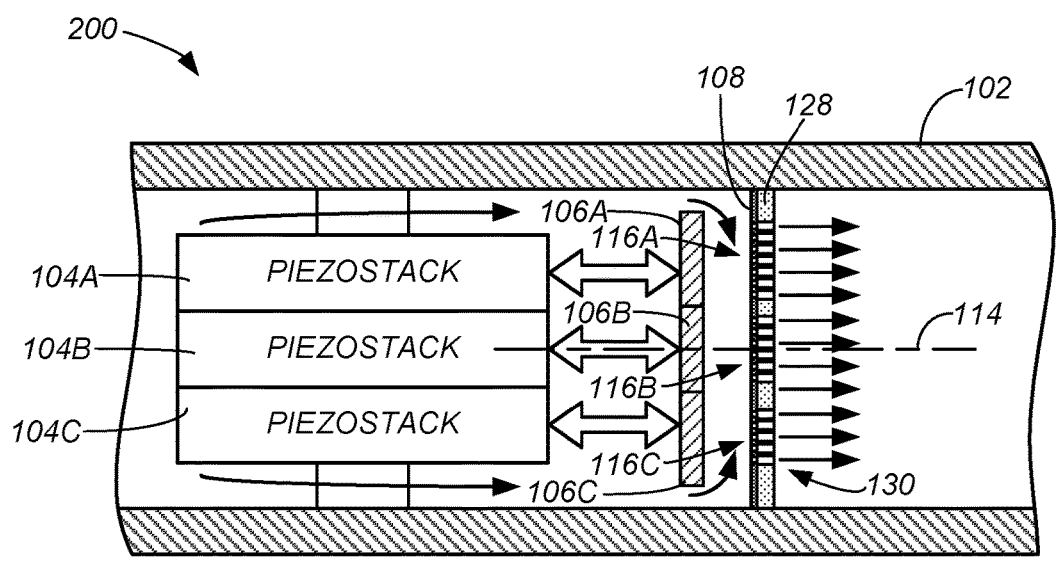
Figure 13:
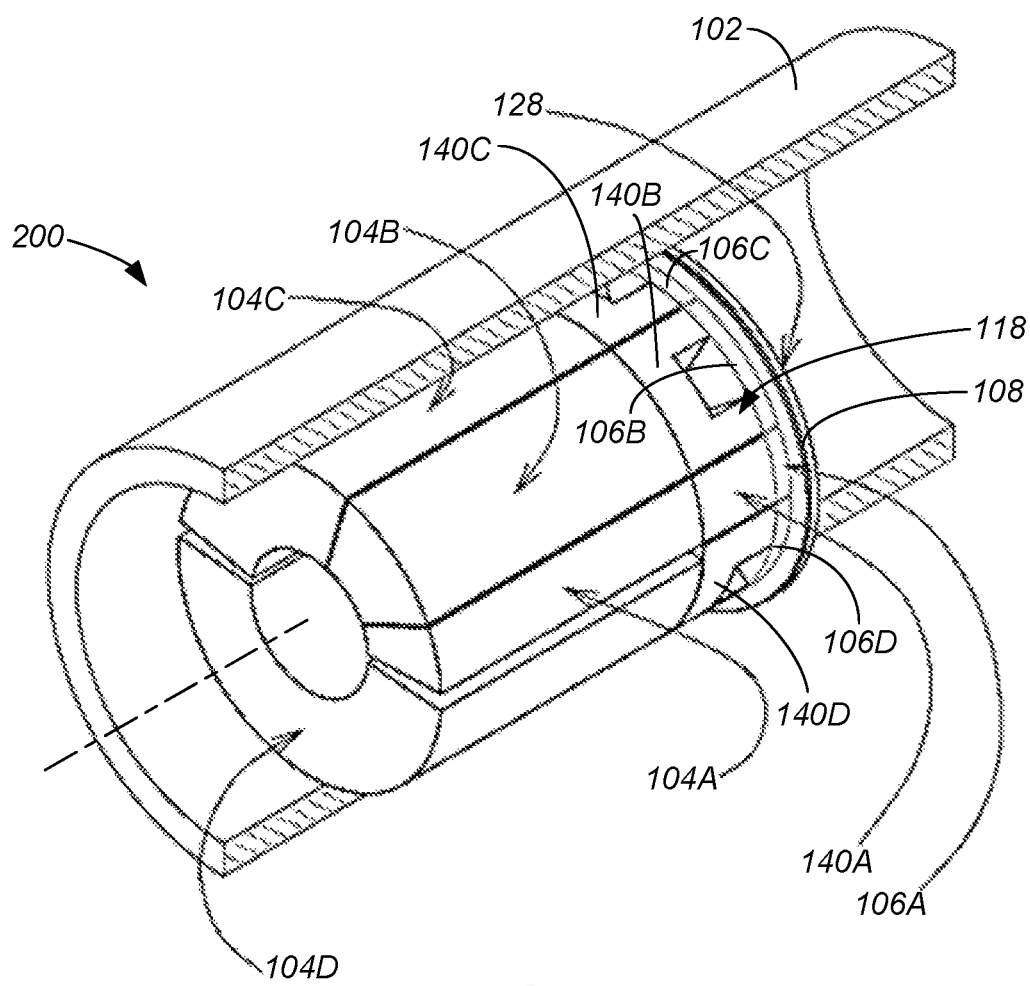
FIG. 13 is an isometric view of an exemplary multi-piezostack actuator valve within a flow conduit in accordance with embodiments of the present disclosure.

In the exemplary valve 200 shown in FIGS. 9-12, three piezostack actuators 104A-C are used to drive movement of corresponding seal plates 106A-C along the longitudinal axis 114 between a closed position (FIG. 9) and open positions (FIG. 12). When in the closed position, the seal plate 106A seals an array of orifices 116A of the orifice plate 108, the seal plate 106B seals an array of orifices 116B of the orifice plate 108, and the seal plate 106C seals an array of orifices 116C of the orifice plate 108, as shown in FIG. 9.

Each of the seal plates 106A-C may be individually actuated from the closed position (FIG. 9) to the open position to provide a different flow rate of the fluid through the conduit 102. In some embodiments, each of the arrays of orifices 116A-116C form an equivalent single orifice of the same diameter. In some embodiments, the arrays of orifices 116A, 116B, and 116C form equivalent single orifices of different diameters. In some embodiments, the equivalent areas of the arrays of orifices 116A-C increase in a binary sequence. For example, one of the seal plates 106 may cover a single orifice 116 of the orifice plate 108, another seal plate 106 covers two orifices 116 of the orifice plate 108, another seal plate 106 covers four orifices 116, another seal plate 106 covers eight orifices 116, etc. In other embodiments, one of the seal plates 106 may cover 44 orifices 116, another seal plate 106 covers 88 (2×44) orifices 116, another seal plate 106 covers 176 (4×44) orifices 116, another seal plate 106 covers 352 (8×44) orifices 116, etc. Proportional flow of fluid through the conduit 102 and the valve 200 can be achieved by fully opening a specified number of the orifices 116 of the orifice plate 108 by selectively actuating the seal plates 106 to their fully open states using the corresponding piezostack actuators 104.

Thus, in operation, a single seal plate 106, such as seal plate 106A, may be actuated using the piezostack 104A to move the seal plate to its open state to provide a corresponding flow rate of fluid through the conduit 102, as shown in FIG. 10. A higher flow rate may be achieved by further actuating seal plate 106C to its fully open state using the corresponding piezostack 104C, as shown in FIG. 11. Yet a further increase in the flow rate of the fluid through the conduit 102 may be achieved by actuating the seal plate 106B to the open state using the corresponding piezostack 104B, as shown in FIG. 12.

The valve 200 may be organized substantially as described above with the valve 100, as shown in FIG. 13. In some embodiments, the seal plate carrier 118 includes separately moveable segments, generally referred to as 140, to allow for the individualized actuation of the corresponding seal plate 106. For example, the piezostack 104A is configured to drive movement of segment 140A, which drives movement of the corresponding seal plate segment 106A along the axis 114 toward or away from the array of orifices 116A (FIG. 9) of the orifice plate 108 to either seal the corresponding array of orifices 116A or open flow through the array of orifices 116A. Likewise, a piezostack 104B drives movement of the segment 140B, which in turn drives movement of the corresponding seal plate 106B along the longitudinal axis 114 to either seal the corresponding array of orifices 116B (FIG. 9) of the orifice plate 108 or open flow through the array of orifices 116B of the orifice plate 108. The piezostack 104C is configured to drive movement of segment 140C, which drives movement of the corresponding seal plate 106C along the axis 114 toward or away from the array of orifices 116C (FIG. 9) of the orifice plate 108 to either seal the corresponding array of orifices 116C or open flow through the array of orifices 116C. A piezostack 104D is configured to drive movement of a corresponding segment 140D, which drives movement of the corresponding seal plate 106D along the axis 114 toward or away from the corresponding array of orifices 116 of the orifice plate 108 to either seal the corresponding array of orifices 116 or open flow through the corresponding array of orifices 116.

In some embodiments, each of the piezostacks 104 of the valve 200 contracts when a voltage is applied to it. In these embodiments, each piezostack seals the corresponding orifices 116 when unpowered, and contracts when in a powered state to unseal the corresponding orifices 116. In some embodiments, each of the piezostacks 104 elongates when a voltage is applied to it. In these embodiments, each piezostack opens the corresponding orifices when in an unpowered state, thereby unsealing the corresponding orifices 116, and elongates or expands when in a powered state to seal the corresponding orifices 116. In some embodiments, each piezostack 104 of the valve 200 is supported in a similar manner as described above with reference to FIG. 7, thereby reversing the opening and closing functions described previously.

Figure 14:
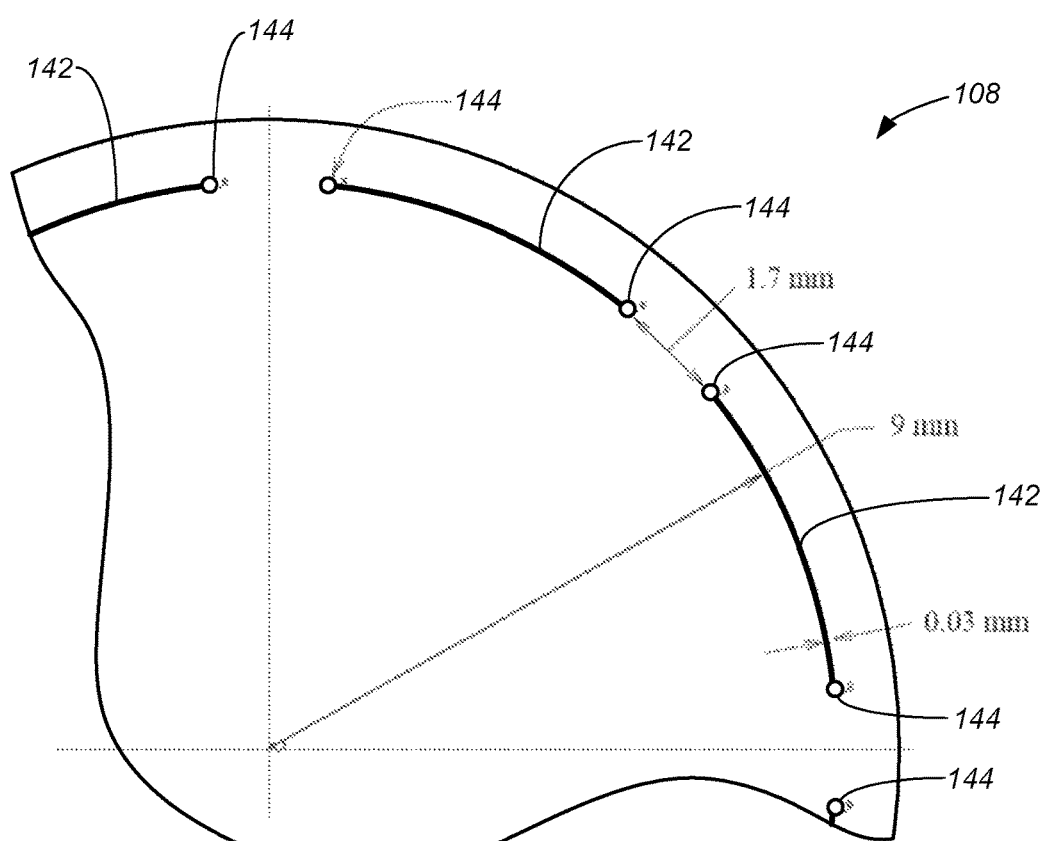
FIG. 14 is a simplified view of a portion of an orifice plate in accordance with embodiments of the present disclosure.

FIG. 14 is a simplified view of a portion of an orifice plate 108 in accordance with additional embodiments of the present disclosure, in which the orifices 116 are in the form of one or more annular rings, annular segments, annular arcs or linear slots, generally referred to as slots 142, that are angularly displaced from each other about the central axis of the orifice plate 108. In some embodiments, the slots 142 are micro-machined through the orifice plate 108. In some embodiments, a width of the annular ring or slots 142 is sized at approximately twice the expected displacement of the piezostack 104. The basis of this sizing is that the flow area around both the inner periphery and the outer periphery of annular ring 142 times the displacement of the end 115 of piezostack 104 will match the area of the annular orifice 142 when the sealing face of seal plate 106 is displaced 50% of the width of the annular ring 142 from the sealing face of orifice plate 108 when the width of annular ring 142 is small compared to its diameter.

In some embodiments, the slots 142 are annular segments or arcs, as shown in FIG. 14. In some embodiments, each end of the slots 42 includes a stress relief hole 144 to reduce stress concentration. In some embodiments, the slots 142 are separated from each other by structural ribs of the plate 108 that extend between the slots 142, such as between the stress relief holes 144, for example. In some embodiments, the slots 142 are uniformly distributed around the central axis of the plate 108. Thus, in some embodiments, the orifice plate 108 includes the same arrangement of slots 142 as the exemplary slots 142 shown in the full quadrant of the plate 108 shown in FIG. 14.

Exemplary dimensions are also shown in FIG. 14 for slots 142 having an opening area that is equivalent to a single orifice having a diameter of 1.25 mm, with the piezostack having a displacement of approximately 15 μm. In some embodiments, the slots 142 have a width of approximately 30 μm.

Alternative shapes can be used in place of the annular ring or arc segments shown in FIG. 14. For example, eight linear slots each having a width of 30 microns could be arranged in an octagonal pattern to approximate a circular annulus.

Although the present invention has been described with reference to preferred embodiments, workers skilled in the art will recognize that changes may be made in form and detail without departing from the spirit and scope of the invention.

What is claimed is:

1. A fluidic control valve configured to control a flow of fluid through a conduit comprising:
   a piezostack actuator;
   a seal plate; and
   an orifice plate comprising a plurality of orifices;
   wherein:
      the piezostack actuator is configured to displace the seal plate along a longitudinal axis between a closed position, in which the seal plate seals the orifices of the orifice plate and closes the valve, and an open position, in which the seal plate is displaced from the orifice plate to open the valve;
      wherein the plurality of orifices includes greater than 20 orifices, each orifice having a diameter of about 10 microns to about 500 microns; and
      a circle having an area that is equivalent to a total area of the plurality of orifices has a diameter that is greater than four times a maximum distance the piezostack actuator displaces the seal plate from the orifice plate when in the open position.

2. The valve according to claim 1, further comprising a support plate attached to the orifice plate, the support plate comprising a plurality of orifices, each of which surrounds at least one of the orifices of the orifice plate.

3. The valve according to claim 1, further comprising a support plate frame attached to the orifice plate and including one or more passages that extend through the support plate frame substantially parallel to the longitudinal axis.

4. The valve according to claim 2, wherein the orifice plate has a thickness, through which the plurality of orifices extend, that is less than 300 microns.

5. The valve according to claim 1, wherein the support plate has a thickness, through which the plurality of orifices extend, that is greater than 500 microns.

6. The valve according to claim 1, wherein the seal plate includes a sealing face that engages the orifice plate when in the closed position.

7. The valve according to claim 6, wherein:
   the seal plate includes a plurality of sealing bosses extending from the sealing face toward the orifice plate, each of the sealing bosses are positioned to overlay one of the orifices when the seal plate is in the closed position; or
   the orifice plate includes a plurality of sealing bosses extending from a surface of the orifice plate toward the sealing face of the seal plate, each of the sealing bosses surrounding one of the orifices.

8. The valve according to claim 1, further comprising a seal plate carrier attached to the seal plate and positioned between the seal plate and the piezostack actuator, wherein the piezostack actuator displaces the seal plate carrier and the attached seal plate along the longitudinal axis between the closed and open positions.

9. The valve according to claim 8, wherein:
   the seal plate includes a central opening;
   a plurality of passages each extending between the seal plate carrier and the seal plate; and
   fluid is configured to flow through the passages and the central opening when the seal plate is in the open position.

10. The valve according to claim 1, wherein the orifice plate has a fixed position relative to the conduit.

11. The valve according to claim 1, wherein the displacement of the seal plate along the longitudinal axis relative to the orifice plate has a 1:1 ratio to movement of the piezostack actuator.

12. The valve according to claim 1, further comprising a sensor configured to detect the displacement between the seal plate and the orifice plate.

13. The valve according to claim 1, wherein the seal plate is moved to the closed position when the piezostack actuator is unpowered.

14. The valve according to claim 1, wherein the seal plate is moved to the open position when the piezostack actuator is unpowered.

15. The valve according to claim 1, wherein the plurality of orifices include at least one slot.

16. The valve according to claim 1, wherein:
   the piezostack actuator is configured to displace the seal plate along the longitudinal axis multiple distances from the orifice plate in response to different voltages applied to the piezostack actuator; and
   each of the multiple distances corresponds to a different fluid flow rate through the valve.

17. The valve according to claim 1, including an elastomer layer between the orifice plate and the seal plate.

18. The fluidic control valve according to claim 1, wherein each of the plurality of orifices has a diameter of less than 200 microns.

19. The fluidic control valve according to claim 1, wherein the seal plate comprises a ring-shaped disc having a central opening, and the plurality of orifices are distributed over the orifice plate within a ring-shaped area.

20. A fluidic control valve configured to control a flow of fluid through a conduit comprising:
   a plurality of piezostack actuators;
   a plurality of seal plates, each seal plate corresponding to one of the piezostack actuators; and
   an orifice plate comprising a plurality of orifices;
   wherein:
      each of the piezostack actuators is configured to move the corresponding seal plate between a closed position, in which the seal plate seals corresponding apertures of the orifice plate, and an open position, in which the seal plate is displaced from the orifice plate;
      wherein the plurality of orifices includes greater than 20 orifices each orifice having a diameter of about 10 microns to about 500 microns; and
      a total area of the plurality of orifices corresponds to an area of a circle having a diameter that is greater than four times a maximum distance the piezostack actuator displaces the seal plate from the orifice plate when in the open position.

* * * * *